United States Patent
Soffer et al.

(10) Patent No.: US 11,586,493 B2
(45) Date of Patent: Feb. 21, 2023

(54) EFFICIENT CHECKSUM COMPUTATION

(71) Applicant: RED HAT, INC., Raleigh, NC (US)

(72) Inventors: Nir Soffer, Raanana (IL); Daniel Erez, Raanana (IL)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 17/216,050

(22) Filed: Mar. 29, 2021

(65) Prior Publication Data
US 2022/0308957 A1  Sep. 29, 2022

(51) Int. Cl.
G06F 11/10 (2006.01)
H04L 9/06 (2006.01)
H04L 9/32 (2006.01)

(52) U.S. Cl.
CPC ........ G06F 11/1004 (2013.01); H04L 9/0643 (2013.01); H04L 9/3239 (2013.01)

(58) Field of Classification Search
CPC ... G06F 11/1004; H04L 9/0643; H04L 9/3239
See application file for complete search history.

(56) References Cited

U.S. PATENT DOCUMENTS

| | | | |
|---|---|---|---|
| 8,417,987 B1* | 4/2013 | Goel | G06F 11/1076 714/6.22 |
| 8,561,056 B2 | 10/2013 | Ermenko et al. | |
| 8,694,879 B1* | 4/2014 | Peichl | G01D 18/00 714/781 |
| 8,874,927 B2 | 10/2014 | Park | |
| 10,235,442 B2 | 3/2019 | Shuster | |
| 10,754,952 B2 | 8/2020 | Muller et al. | |
| 10,860,537 B2 | 12/2020 | Bath et al. | |
| 10,877,928 B2 | 12/2020 | Nagrale et al. | |
| 2003/0163449 A1* | 8/2003 | Iwano | G11B 27/329 |
| 2009/0259924 A1* | 10/2009 | Amann | G06F 3/061 714/E11.031 |
| 2010/0205518 A1* | 8/2010 | Golitschek Edler von Elbwart | H04L 1/0083 714/E11.032 |

(Continued)

OTHER PUBLICATIONS

Gopalan Sivathanu et al., "Enhancing File System Integrity Through Checksums", https://www.filesystems.org/docs/nc-checksum-tr/nc-checksum.html, Stony Brook University, 2004, 7 pages.

(Continued)

*Primary Examiner* — Albert Decady
*Assistant Examiner* — Enamul M Kabir
(74) *Attorney, Agent, or Firm* — Lowenstein Sandler LLP

(57) ABSTRACT

An example method may include identifying, in a plurality of blocks of data, one or more unallocated blocks, wherein the plurality of blocks further comprises one or more allocated blocks, generating a plurality of checksums, wherein each checksum corresponds to one of the blocks, and the checksums comprise a plurality of first checksums and a plurality of second checksums, wherein each of the first checksums corresponds to one of the unallocated blocks and comprises a predetermined checksum of a block of zeros, and wherein each of the second checksums corresponds to one of the allocated blocks and comprises a checksum of the corresponding one of the allocated blocks, and generating a result checksum in view of the plurality of checksums.

17 Claims, 9 Drawing Sheets

(56) References Cited

U.S. PATENT DOCUMENTS

| | | | |
|---|---|---|---|
| 2012/0041931 A1* | 2/2012 | Ross | G06F 21/64 |
| | | | 707/693 |
| 2015/0370860 A1* | 12/2015 | Bender | G06F 16/24575 |
| | | | 707/693 |
| 2016/0234296 A1* | 8/2016 | Zucca | H04L 67/1097 |
| 2018/0143872 A1* | 5/2018 | Sun | H03M 13/6502 |
| 2018/0255069 A1 | 9/2018 | Ghiondea et al. | |

OTHER PUBLICATIONS

Rusty Russell's Coding Blog, ccan/mem's memeqzero iteration, http://rusty.ozlabs.org/?p=560, Oct. 20, 2015, 16 pages.

* cited by examiner

EFFICIENT CHECKSUM COMPUTATION

TECHNICAL FIELD

The present disclosure is generally related to computer systems, and more particularly, to checksum computation.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

A checksum herein shall refer to a data value computed from a larger block of data in order to determine whether the block of data has changed. The checksum computation generates a different value for each input, so that a change in the block of data can be detected by computing the checksum and comparing the computed checksum to a previously-computed checksum. If the two checksums are different, then the two inputs are very likely to be different. Cryptographic hash functions, for example, output different values for different inputs, and can be used to detect data corruption errors and verify data integrity.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
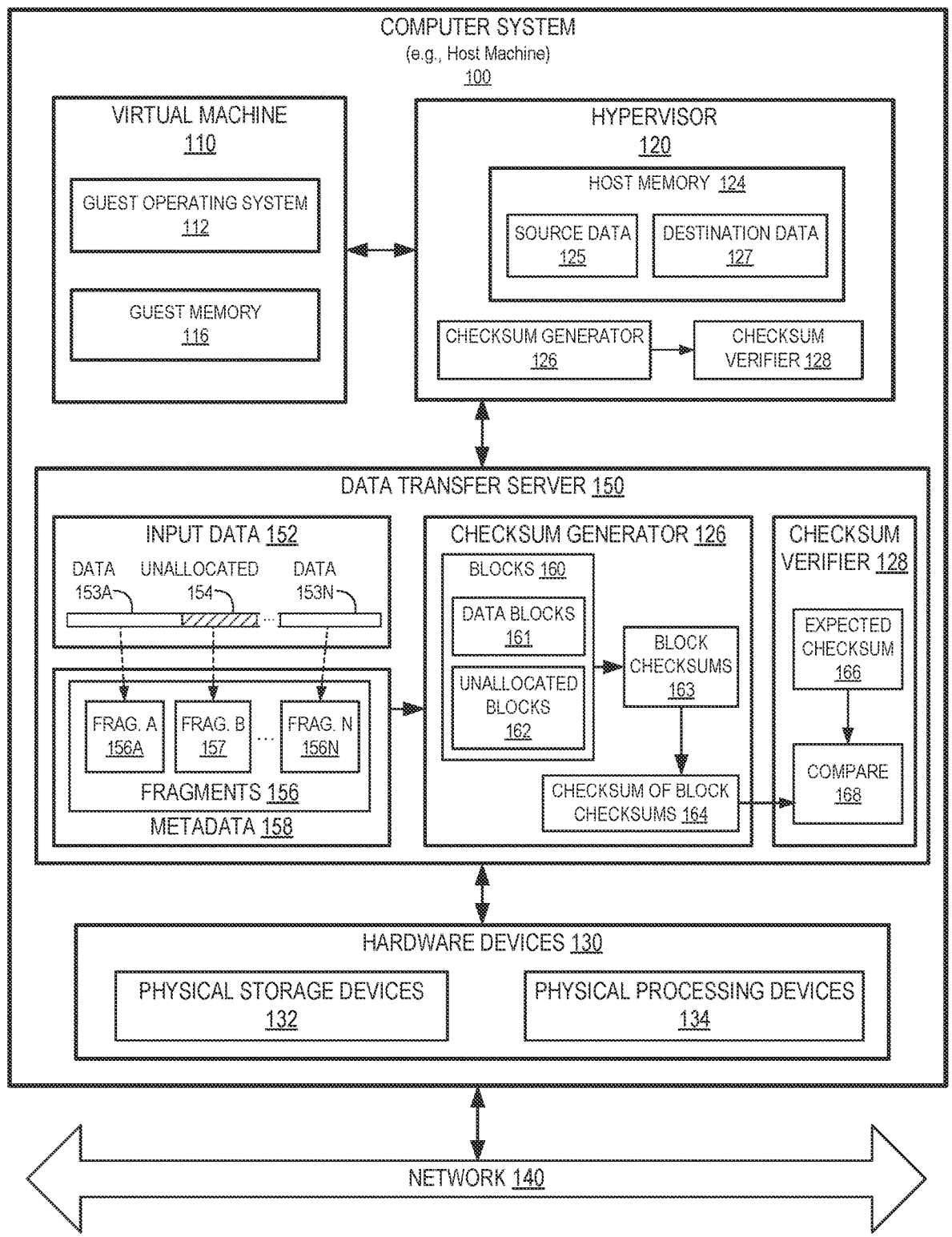
FIG. 1 depicts a high-level block diagram of an example host computer system that performs efficient checksum computation, in accordance with one or more aspects of the present disclosure.

Described herein are systems and methods for efficiently computing checksums of data in virtualization systems. A virtualization system may perform data input and output operations such as copying data on a storage device or transferring data across a communication network, and may compute checksums of the data to verify that the data has correctly been copied or transferred. The data may be stored in the form image files that represent virtual disks, for example. Files or data that represents files, such as image files and virtual disks, often have unallocated portions in which no information is stored. "Unallocated portion" herein shall refer to one or more disk blocks that have not been allocated to store user data or metadata. The sizes and locations of unallocated portions in a file may be specified by metadata associated with the file. Guest operating systems or applications that read from unallocated portions of a file may receive data in which each byte value is zero ("zeros"), since the virtualization system or guest operating system may translate each unallocated portion to a sequence of consecutive zeros when the unallocated portion is read. Alternatively or additionally, a file can have sequences of zeros in allocated portions.

The virtualization system may use checksums to verify that data copy or transfer operations produce a correct copy of the data. For example, the virtualization system may perform a transfer operation that downloads an existing image file from an external system to the virtualization system. The transfer operation produces a new file on the virtualization system that is expected to be a copy of the existing image file. The virtualization system may verify that the new file is a correct copy of the existing image file by comparing a checksum of the existing image file to a checksum of the new file. If the checksums match, then the new file is very likely to be a correct copy of the existing file.

However, the data may be sufficiently large such that calculating the checksums would consume a substantial amount of processing time. Image files that represent virtual disks may be multiple gigabytes in size, for example. In one example, computing a checksum of a one-terabyte file may consume approximately 30 minutes of processing time, which is not practical for operations commonly performed in virtualization systems, such as uploading, downloading, copying, and moving image files.

Aspects of the present disclosure address the above-noted and other deficiencies by providing technology that efficiently generates checksums of data containing blocks that correspond to zeros ("zero blocks"). A block that corresponds to zero, also referred to herein as a "zero block", may be an unallocated block or a block of zeros. A block of zeros may be a block in which each bit is a zero bit (e.g., each byte is zero). A checksum generator may generate a checksum or other fingerprint, such as a cryptographic hash, of data by partitioning the data into blocks, generating a block checksum of each block, and generating a checksum of the block checksums. The checksum of the block checksums corresponds to a checksum of the data. The checksum generator may generate the block checksum of each block by determining whether the block is a zero block. If the block is a zero block, the checksum generator may use a predetermined zero block checksum as the block checksum of the block. If the block is not a zero block, the checksum generator may calculate a block checksum of the block. The checksum generator can efficiently identify blocks that correspond to zeros using metadata information associated with the data, if available, or using a fast memory comparison operation that compares the block data to zeros.

Advantages of the present disclosure include, but are not limited to, reduction in the amount of processing time needed by checksum computations for files containing unallocated portions. Since checksum computations can be performed in a virtualization system in various operations such as uploading image files to virtual disks, downloading virtual disks to image files, cloning or moving virtual disks, and creating or deleting snapshots of virtual machine memory, reducing the time consumed by checksum computations can speed up the aforementioned operations, thereby reducing delays experienced by users and enabling larger virtual disks or other files to be processed without excessive delays.

Calculation of the hash of data that contains unallocated portions and/or zeros can be substantially faster using the disclosed technology, because, for example, there is no need to perform a hash computations of the unallocated portions or zeros. Unallocated portions can be identified quickly using metadata or, for storage that does not support such metadata, using efficient memory comparison operations. A pre-calculated hash may be used for each block that corresponds to zeros, so that the hashes of blocks that correspond to zeros need not be calculated repeatedly.

Various aspects of the above referenced methods and systems are described in details herein below by way of examples, rather than by way of limitation. The examples provided below discuss a checksum generator that uses checksum algorithms, e.g., cryptographic hash functions. In other examples, the memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machine 110, hypervisor 120, data transfer server 150, hardware devices 130, and a network 140.

Virtual machine 110 may execute guest executable code that uses an underlying emulation of the physical resources. The guest executable code may include a guest operating system, guest applications, guest device drivers, etc. Virtual machines 110 may support hardware emulation, full virtualization, para-virtualization, operating system-level virtualization, or a combination thereof. Virtual machine 110 may have the same or different types of guest operating systems, such as Microsoft®, Windows®, Linux®, Solaris®, etc. Virtual machine 110 may execute guest operating system 112 that manages and guest memory 116.

Guest memory 116 may be any virtual memory, logical memory, physical memory, other portion of memory, or a combination thereof for storing, organizing, or accessing data. Guest memory 116 may represent the portion of memory that is designated by hypervisor 120 for use by virtual machine 110. Guest memory 116 may be managed by guest operating system 112 and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values. In one example, the guest pages may be memory blocks of a volatile or non-volatile memory device and may each correspond to an individual memory block, multiple memory blocks, or a portion of a memory block.

Host memory 124 (e.g., hypervisor memory) may be the same or similar to the guest memory 116 but may be managed by hypervisor 120 instead of a guest operating system. Host memory 124 may include host pages, which may be in different states. The states may correspond to unallocated memory, memory allocated to guests, and memory allocated to hypervisor. The unallocated memory may be host memory pages that have not yet been allocated by host memory 124 or were previously allocated by hypervisor 120 and have since been deallocated (e.g., freed) by hypervisor 120. The memory allocated to guests may be a portion of host memory 124 that has been allocated by hypervisor 120 to virtual machine 110 and corresponds to guest memory 116. Other portions of hypervisor memory may be allocated for use by hypervisor 120, a host operating system, hardware device, other module, or a combination thereof.

Hypervisor 120 may also be known as a virtual machine monitor (VMM) and may provide virtual machine 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include checksum generator 126 and checksum verifier 128. The hypervisor 120 may use checksum generator 126 and checksum verifier 128 to verify, for example, that destination data 127 in host memory 124 copied from source data 125 in host memory 124, or destination data 127 received via network 140 from a another computer system, has the same content as the source data 125. The destination data 127 may be, for example, a disk image, a snapshot, or other file, which the hypervisor 120 may access via host memory 124 or an Input/Output (I/O) device interface such as a block device. The hypervisor 120 may use the checksum generator 126 to generate a checksum of the destination data 127, and use the checksum verifier 128 to compare the generated checksum to an expected checksum associated with the destination data 127. The hypervisor 120 may generate the expected checksum using the checksum generator 126 on the source data 125. If the source data 125 is not available to the hypervisor 120, e.g., because the source data 125 is located on another computer system from which the destination data 127 was received via the network 140, the hypervisor 120 may receive the expected checksum from the other computer system via the network 140. If the checksum verifier 128 determines that the generated checksum of the destination data 127 corresponds to (e.g., is equal to) the expected checksum, then the destination data 127 is most likely the same as the source data 125, and the hypervisor 120 may proceed with processing the destination data 127 or providing the destination data 127 to another component, such as the virtual machine 110. The features of the checksum generator 126 and checksum verifier 128 are discussed in more detail below in regards to the data transfer server 150.

Data transfer server 150 may transfer input data 152, such as disk images, received from other computer systems to hypervisor 120 via network 140. Data transfer server 150 may receive the input data 152 via the secure Hypertext Transfer Protocol (HTTPS) or other suitable protocol. The input data 152 may be stored on one or more physical storage devices 132. The input data 152 may be read into a memory accessible by the data transfer server, such as host memory 124. The input data 152 may include content stored as a sequence of bytes, for example.

The input data 152 may be sparse data that may include allocated data portions 153A, 153N and one or more unallocated portions 154. Input data 152 may be a sequence of bytes in which each byte has an associated location, e.g., an offset from the beginning of the input data 152. Thus, data may be stored in the input data 152 at any byte location that is within a range (e.g., between 0 and $2^{64}$-1 for a 64-bit address space). Data that has been stored in a location may be referred to as valid data. Portions of the input data 152, e.g., locations, in which valid data is stored, are referred to herein as allocated data portions 153A or data portions 153A. Portions of the input data 152 in which valid bytes are not stored are referred to herein as unallocated portions 154. Although unallocated portions 154 may not contain valid data, the unallocated portions 154 may be translated or otherwise mapped to particular data by components of the computer system, such as the guest operating system 112, the hypervisor 120, or other components. For example, an application (e.g., running in the guest operating system 112) that reads from an unallocated portion 154 may receive zeroes, because the guest operating system 112 may provide results that contain a zero value for bytes read from locations of unallocated portions 154, even if the unallocated portions 154 do not contain zero values at the locations. For example, if the input data 152 is accessed using an ordinary file access programming interface provided by the guest operating system 112, the unallocated portions of the input data 152 appear to contain zeros.

Metadata 158 may specify which allocated data portions 153 contain valid data (e.g., are allocated), and which portions do not contain valid data (e.g., are unallocated). Unallocated portions 154 do not ordinarily use storage space, aside from storage space that stores metadata 158 related to the unallocated portions 154. Thus, in sparse data storage, unallocated portions of the input data 152 may have large sizes, e.g., multiple megabytes or gigabytes, but do not necessarily consume actual space in the input data 152 beyond the metadata 158 that specifies their attributes. The metadata 158 may be stored on the same storage device as the input data 152.

Checksum generator 126 may efficiently generate checksums of files that contain unallocated portions by identifying the unallocated portions 154 using the metadata 158 and processing the unallocated portions 154 efficiently, e.g., using a pre-computed checksum of a sequence of zeros for unallocated portions 154 and/or of allocated data portions 153A that contain zeros, as descried below with regards to checksum generator 126.

Input data 152 may include or be associated with metadata 158 that may specify the locations of unallocated portions 154 in the input data 152. Metadata 158 may be present if, for example, the input data 152 represents a disk image or filesystem in a format that supports sparse data storage. Metadata 158 may specify the locations and sizes of allocated data portions 153 and unallocated portions 154 as a sequence of "fragments" 156. Each fragment 156 may be, e.g., a data structure that includes a start location (e.g., an offset from the beginning of the input data 152), a length (e.g., a number of consecutive bytes represented by the fragment 156), and one or more additional attributes, such as an allocation attribute that indicates whether the fragment 156 represents valid data. The allocation attribute may be named "HasData" and may have a value of true or false. Thus, if a fragment's HasData attribute is true, then the portion of the input data 152 represented by the fragment is allocated, whereas if a fragment's HasData attribute is false, the portion of the input data 152 represented by the fragment is unallocated. The fragments 156 may include one or more fragments 156A-156N (e.g., fragment A 156A, fragment B 157, and fragment N 156N). Each fragment 156 may correspond to a portion of the input data 152. Thus, fragment A 156A corresponds to allocated data portion 153A, fragment B 157 corresponds to unallocated portion 154, and fragment N 156N corresponds to data portion 153N.

Different fragments 156 may correspond to data portions of different sizes. In particular embodiments, checksum generator 126 processes fixed-size portions, so the fragments 156 may be translated to blocks 160, which represent fixed-size portions of the input data 152. Each of the blocks 160 may be, e.g., a data structure that includes a start location (such as an offset from the beginning of the input data 152), a length (such as a number of consecutive bytes represented by the block 160), and one or more additional attributes, such as an allocation attribute with a name such as "HasData" that indicates whether the block 160 represents valid data. The length of each block 160 is ordinarily a predetermined block size, and the length attribute may be omitted from blocks 160 having lengths equal to the predetermined block size. The block size may be, e.g., 16 megabytes (MiB), 128 MiB, 512 MiB, 1 GiB, 4 GiB, 8 GiB, or other suitable size. The last block 160 may have a shorter length (e.g., less than the block size). Thus, blocks 160 are similar to fragments 156, but each of the blocks ordinarily has the same length, except for the last block. Blocks 160 may include data blocks 161, which correspond to allocated data portions 153. Each of the data blocks 161 may have HasData=true. Blocks 160 may also include unallocated blocks 162, which correspond to unallocated portions of input data 152. Each of the unallocated blocks 162 may have HasData=false.

The input data 152 may be, for example, data of a fragment-based filesystem, or data in another format such as QCOW (QUEMU Copy On Write, e.g., QCOW2 or the like). For input data 152 that supports sparse data storage, the metadata describing the locations of non-zero data and the locations of zero data (e.g., unallocated portions 154) may be represented by the metadata 158. Alternatively, the input data 152 may be data in a format that does not support sparse data storage (e.g., a raw block device that does not have metadata related to sparse data), in which case the input data does not include unallocated portions 154. If metadata 158 is not present, then checksum generator 126 may process the input data 152 as a sequence of bytes.

Checksum generator 126 may generate one or more blocks 160 from the input data 152 by partitioning the input data 152 into fixed-length portions according to the block size(s), for example. A block 160 may be generated for each portion of the input data 152. If the input data 152 includes metadata 158 that specifies fragments 156, then the checksum generator may translate the fragments 156 to fixed-size blocks 160. A data block 161 may be generated for each allocated data portion 153, and an unallocated block 162 may be generated for each unallocated portion 154 of the input data 152. As noted above, each of the fragments 156 may have an associated length, and different fragments may have different lengths, so translating the fragments 156 to blocks 160 may involve mapping the variable-length portions 153, 154 of input data 152 (e.g., represented by the fragments 156) to the fixed-length portions represented by the blocks 160, as well as determining the allocation attribute of each block 160 (e.g., using the "HasData" attribute of each fragment 156).

Blocks 160 may be generated from the fragments 156 by splitting or merging the fragments 156 to form blocks 160 of specified block size(s), for example. Each fragment 156 may be mapped to a portion of one block 160, one block 160, or multiple blocks 160, depending on the block size and the fragment size. In some embodiments, each block 160 may have the same block size, except the last block 160, which may be smaller. As described below with respect to FIG. 3B, each fragment 156 that is smaller than the block size may be merged into a block 150 with one or more other fragments 156. Note that for brevity, the description herein may refer to a block's data as an abbreviation for the portion of input data 152 to which the block corresponds. For example, the phrase "a block contains data" or "includes data" may refer to the data to which a block 160 corresponds.

Since a block 160 that corresponds to data 152 containing at least one non-zero bit is an allocated block, merging may convert an unallocated block to an allocated block, or move a portion of an unallocated block into an allocated block. For example, a 160 block initially having a "HasData" attribute=false may have its "HasData" attribute changed to true if a fragment having a "HasData" attribute of true is merged into the block. As described below with respect to FIG. 3C, fragments 156 larger than the block size may be split into multiple blocks. As described below with respect to FIG. 3D, if the end of the last fragment 156 does not coincide with the end of the last block, the last block length may be smaller than the block size.

Checksum generator 126 may compute a block checksum 163 of each of the blocks 160. Note that although checksum generator 126 is described as computing checksums, the checksum generator 126 may alternatively or additionally compute hashes, such as cryptographic hashes (e.g., SHA-2, SHA-3, BLAKE2, or the like). A hash function may be any function that may be used to map data of arbitrary size to data of a fixed size. The values calculated by the hash function may be referred to as hash values, hash codes, digests, or simply hashes. The hash function may enable a device that intends to execute a computer program to easily identify and verify the content of an object associated with the computer program. A property of a cryptographic hash is that it may enable a computing device to verify that received input data maps to a given hash value, but if the input data is unknown it may be deliberately difficult to reconstruct it by knowing the stored hash value. This property may enhance the ability of the computing device to determine the integrity of a received object. In one example, the hash function may be a Secure Hash Algorithm (e.g., SHA-2, SHA-3, SHA-(n)) but in other examples it may be another cryptographic hash function (e.g., MD5, MDC-2) or a non-cryptographic hash function (e.g., checksum, Cyclic Redundancy check (CRC)).

Checksum generator 126 may generate a checksum 164 of input data 152 with efficient processing of unallocated portions 154 of the input data 152, or to allocated data portions 153 of the input data 152 that contain zeros. The unallocated portions 154 may correspond to unallocated blocks 162, and the allocated data portions 153 that contain zeros may correspond to data blocks 161 for which each bit of the corresponding data is zero. The checksum 164 may be a checksum of block checksums 163. Each block checksum 163 may be the checksum of a corresponding block 160. Checksum generator 126 may generate block checksums 163 using a checksum algorithm or other suitable algorithm, e.g., a cryptographic hash algorithm. Checksum generator 126 may efficiently generate block checksums 163 by determining, for each of the blocks 160, whether the block is a zero block. A zero block may be an unallocated block 162 or a data block 161 in which each bit is zero. If the block 160 is a zero block, then checksum generator 126 may use a pre-calculated checksum of a zero block as the block checksum 163. The pre-calculated checksum may be calculated once for a zero block of the same block size used to generate the blocks 160, and subsequently used for each of the zero blocks.

Checksum generator 126 may determine whether each block 160 is an unallocated block 162 or a data block 161 by checking the "HasData" attribute of the block. If the attribute indicates that the block is an unallocated block 162 (e.g., the block's "HasData" attribute is false), then checksum generator 126 may use the pre-calculated checksum for the block. Further, if the block's "HasData" attribute indicates that the block is an allocated data block 162 (e.g., "HasData"=true), the checksum generator 126 may determine whether the block's corresponding data is a sequence of zeros. A block having corresponding data that is a sequence of zeros may have been generated from a fragment that includes a sequence of zeros of at least the block size in length, which is sufficient to fill the block with zeros, for example. As another example, if the input data 152 does not include metadata 158, then portions of the input data 152 that correspond to unallocated portions 154 may contain sequences of zeros (e.g., because the operating system may return data containing zeros when the unallocated portions 154 are read). The checksum generator 126 may identify a data block 161 that corresponds to a sequence of zeros by comparing each of the data bytes corresponding to each of the blocks 160 to the value of a zero byte (0). If a non-zero byte is identified, then the block does not contain a sequence of zeros. Otherwise, e.g., if each data byte has the value zero, then the block contains a sequence of zeros.

Alternatively or additionally, the checksum generator 126 may use an efficient technique to determine whether a data block 161 corresponds to a sequence of zeros of input data 152, such as checking whether the first N data bytes of the data corresponding to the data block 161 are zero (for values of N such as 1, 8, 16, 32, or the like), and, if so, invoking a memory comparison function (e.g., memcmp) to efficiently compare the remaining bytes of the block to zero. The memory comparison function may be invoked with the memory locations of the Nth block in the sequence and the (N+1)st data bytes of the block as the memory areas to compare, and the length of the block's data minus N as the length of the sequence to compare. For example, the memcmp function has three parameters: a first pointer p1, a second pointer p2, and a number of bytes n. The memcmp function compares the first n bytes of memory pointed to by ptr1 to the first n bytes of memory pointed to by p2, and returns zero if the first n bytes match (or a nonzero value if they do not). The memory pointed to by p1 can overlap with the memory pointed to by p2, so memcmp can be used to determine whether each byte of a block's data that starts at a memory location b as follows (where N=1):

if (b[0]=='\0')
    result=memcmp(b+1, b, blocksize-1);

If the result of memcmp is zero, then the block corresponds to a sequence of zeros of the length as the block size. The memcmp function compares b[1] to b[0], then, proceeds to the next byte if b[1] equals b[0]. Since b[0] is zero (as verified by the initial if condition), the comparison determines whether b[1] equals zero. Thus, if b[1] equals zero, memcmp proceeds to compare the next byte. If not, memcmp returns a non-zero result indicating that the bytes being compared are not equal. As an example, if b[1] is zero, then memcmp proceeds to the next byte and compares b[2] to b[1]. Since b[1] is zero, the comparison determines whether b[2] equals zero and, if so, proceeds to the next byte, and so on until blocksize-1 comparisons have been performed. Efficiency may be further improved by using larger values of N, as described above, in which case the initial if statement may compare the first N bytes of b to zero, and memcmp may be invoked as memcmp(b+N, b, blocksize-N). In this way, the memory comparison function compares each byte of the sequence to the previous byte. Since the first byte is zero, the memory comparison function determines whether each of the bytes in the sequence is zero. The memory comparison function may be implemented using a processor instruction that may perform the comparison very quickly, so the determination of whether a block 160 is a zero block may be performed efficiently.

If a data block 161 corresponds to a sequence of zeros, the checksum generator 126 may use the precomputed checksum of the data block 161 as the block checksum 163 that corresponds to the data block 161. If data block 161 does not correspond to a sequence of zeros, e.g., the memory comparison function indicates that the data block 161 contains at least one byte having a non-zero value, then the checksum generator 126 may calculate the checksum (or other desired function, e.g., cryptographic hash) of the data block 161.

The checksum generator 126 may determine the checksum 164 of the input data 152 by calculating a checksum of the block checksums 163. The block checksums 163 may be provided as input to a checksum function in the order in which they are generated (in the order of their associated blocks), e.g., as a sequence of checksum values. Alternatively or additionally, the checksum generator 126 may use a checksum calculation function, referred to herein as an "update" function, that can be invoked repeatedly with incremental updates to the input data 152. To calculate the checksum of the block checksums 163, the checksum generator may invoke the update function for each of the block checksums 163 (e.g., passing each block checksum to a separate invocation of the update function). The checksum generator 126 may then invoke a "get checksum" function that returns the checksum of the values previously provided to the update function. For example, the checksum generator 126 may invoke the update function in response to determining the block checksum 163 for each block 160, and invoke the "get checksum" function after the update function has been invoked for each of the block checksum 163. The "get checksum" function may then be invoked to calculate the checksum 164 of the block checksums 163.

The checksum verifier 128 may verify that the input data 152 corresponds to (e.g., has the same content as) other data for which an expected checksum 166 has been provided to the checksum verifier 128. A compare operation 168 determines whether the checksum 164 of the input data corresponds to (e.g., has the same value as) the expected checksum 166. If so, the input data 152 corresponds to the other data. If not, e.g., if the checksum 164 is not equal to the expected checksum 166, then the input data differs from the other data.

The checksum generator 126 may generate multiple block checksums 126 in parallel to further improve efficiency. For example, the checksum generator may create multiple threads, and each thread may process one or more of the blocks 160. In response to completion of generation of the block checksums 163, the checksum generator may use one thread to compute the checksum 164 of the block checksums 163.

Hypervisor 120 or other components of the computer system 100, such as virtual machine 110, data transfer server 150, or the like, may perform other data copy or transfer operations and use checksum generator 126 and checksum verifier 128 to verify that the data has been correctly copied or transferred. The operations may include, for example, cloning a virtual disk, moving a virtual disk between storage devices, creating a snapshot of a virtual disk, or deleting a snapshot of a virtual disk. The hypervisor 120 or other component of the computer system 120 may perform the operation and verify that a first virtual disk is correctly copied as follows. The hypervisor 120 may receive a request to perform an operation associated with the first virtual disk. The first virtual disk may contain first data. The hypervisor 120 may perform the operation, e.g., copying the first virtual disk, and the operation may generate a second virtual disk comprising second data that is a copy of the first data. The hypervisor 120 may verify the second virtual disk by using checksum generator 126 to generate a second checksum of the second virtual disk, and/or a second checksum of the second data, and using checksum verifier 128 to determining whether the second checksum corresponds to the generated result checksum of the first virtual disk or data (e.g., whether the second checksum equals the generated result checksum). If the second checksum corresponds to the generated result checksum, then the second virtual disk or second data is a correct copy of the first virtual disk or first data, respectively.

In particular embodiments, hypervisor 120 or other component of the computer system 100 may determine whether a virtual disk has been modified. The virtual disk comprises the data 152, and the virtual disk is associated with an initial checksum that corresponds to an initial state of the virtual disk. The checksum generator 126 may generate a result checksum 164 of the data 152. The checksum generator 126 may verify that the virtual disk has not been modified. To perform the verification, the checksum verifier 128 may determine whether the initial checksum corresponds to (e.g., is equal to) the generated result checksum. If the initial checksum corresponds to the generated result checksum 164, then the virtual disk has not been modified.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that may be implemented using various data processing equipment, communication towers, etc.

Figure 2:
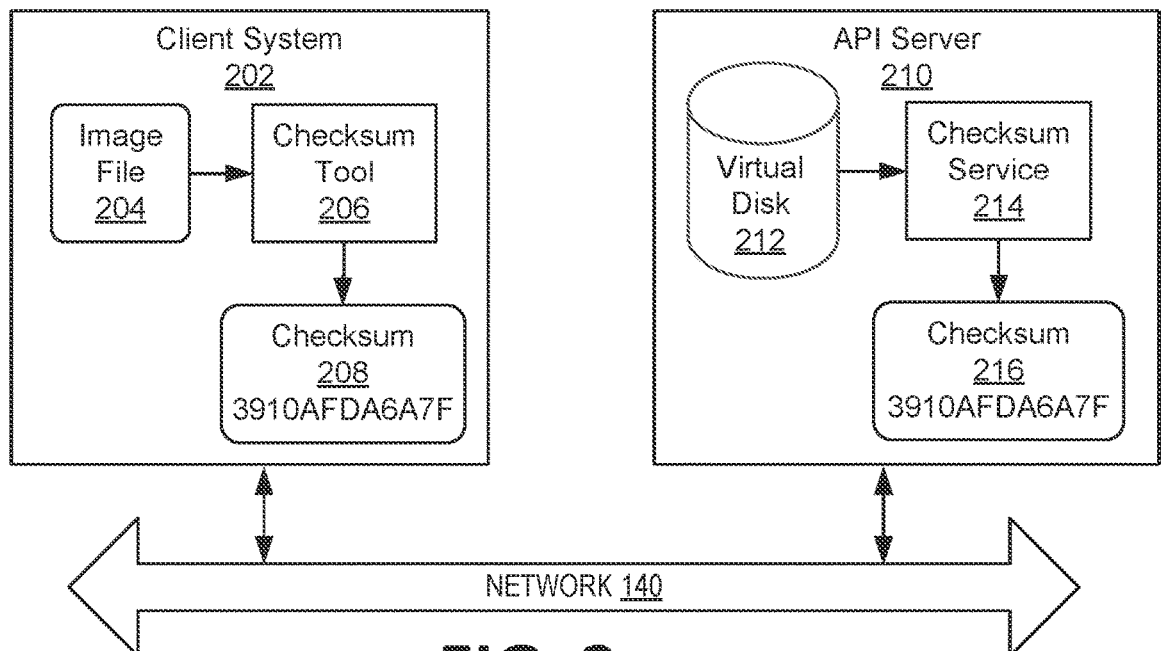
FIG. 2 depicts an example use of checksums to verify an image file uploaded to an API server, in accordance with one or more aspects of the present disclosure.

FIG. 2 depicts an example use of checksums to verify an image file uploaded to an API server, in accordance with one or more aspects of the present disclosure. A client system 202, e.g., a host machine, may upload an image file 204 to an Application Programming Interface ("API") Server, which may be another host machine, for example. The client system 202 and/or the API server 210 may be components of a virtualization system. The client system 202 may include a checksum tool 206. The checksum tool 206 may use the checksum generator 126 to calculate a checksum 208 of the image file. The checksum 208 is "3910AFDA6A7F" in this example. The client system 202 may send the data of the image file 204 and the checksum 208 to the API server 210 via the network 140. The API server 210 may receive the data of the image file 204 and the checksum 208 from the client system 202. The API server 210 may create a virtual disk 212 that includes the data of the image file 204. The API server 210 may include a checksum service 214. The checksum service 214 may use the checksum generator 126 to calculate a checksum 216 of the virtual disk 212 (e.g., of a portion of the virtual disk 212 that includes the data from the image file 204). The API server 210 may compare the checksum 208 received from the client system 202 to the checksum 216 calculated from the virtual disk 212. If the received checksum 208 matches the checksum 216 (e.g., the two checksums are equal), then the virtual disk 212 includes the same data as the image file 204, and the API server 210 can proceed to use the virtual disk 212, e.g., in the virtualization system. For example, the API server 210 and/or virtualization system can provide the virtual disk to a guest operating system if the checksum 208 matches the received checksum 208.

The client system 202 may download an image file 204 that represents a virtual disk 212 from the API serer 210. The client system 202 may send a request to download the virtual disk. The request may include a virtual disk name or identifier specifying the particular virtual disk that is to be downloaded. The API server 210 may receive the request to download the virtual disk 212 and identify the specified virtual disk that corresponds to the name or other identifier specified in the request. The API server 210 may calculate a checksum 216 of the virtual disk 212, e.g., using the checksum service 214. The API server 210 may send the virtual disk 212 (or an image file generated from the virtual disk 212), and checksum 216 of the virtual disk 212 (or of the generated image file) to the client system 202. The client system 202 may receive the virtual disk 212 (or image file) and the corresponding checksum. The client system 202 may generate a checksum 208 of the received image file and compare the generated checksum 208 to the received checksum. If the generated checksum 208 matches the received checksum, then the received image file is a correct copy of the original virtual disk, and the client system 202 may use the image file 204.

Figure 3A:
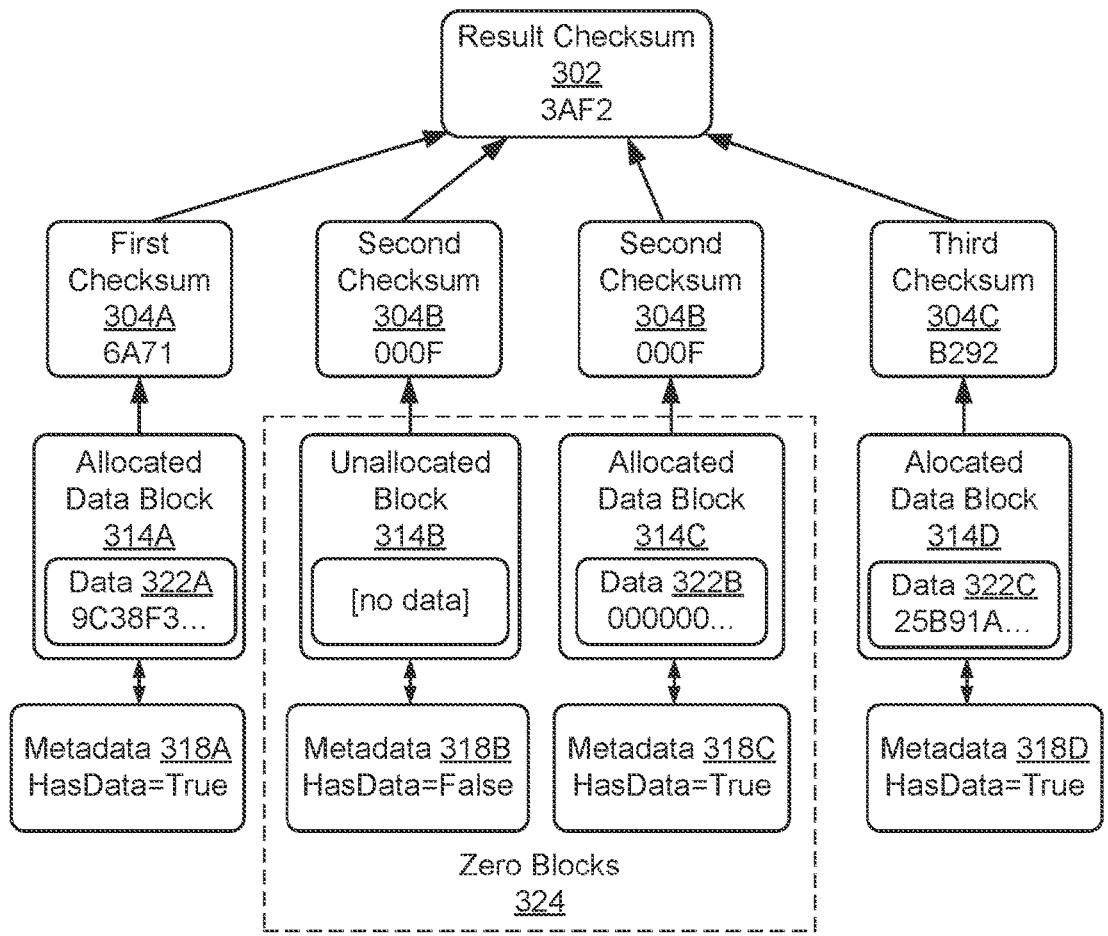
FIG. 3A depicts an example calculation of a checksum of sparsely-allocated data, in accordance with one or more aspects of the present disclosure.

FIG. 3A depicts an example calculation of a checksum of sparsely-allocated data, in accordance with one or more aspects of the present disclosure. The checksum calculation may be performed by, for example, the checksum generator 126. The checksum calculation in the example of FIG. 3A is performed on sparsely-allocated data, which includes allocated data blocks 314A, 314C, 314D and unallocated block 314B. Each of the blocks 314 is associated with corresponding metadata 318, which may include a start address and length (not shown), as well as a "HasData" attribute, which may be true or false, and indicates whether the corresponding block is allocated data ("HasData"=true) or unallocated ("HasData"=false).

For example, block 314A is an allocated data block that corresponds to an allocated portion 153 of input data 152, as specified by metadata 318A ("HasData"=true), and includes non-zero data 322A. Non-zero data may be, e.g., data containing at least one non-zero bit. Block 314B is an unallocated block, as specified by metadata 318B ("HasData"=false), and thus does not include any valid data. Thus, block 314B may be referred to herein as a zero block. Block 314C is an allocated data block, as specified by metadata 318C, and includes data 322B in which each bit is zero. Thus, block 314C may be referred to herein as a zero block. Block 314D is an allocated data block, as specified by metadata 318D, and includes non-zero data 322C. Blocks 314B and 314C are examples of zero blocks 324, since block 314B is unallocated and block 314C includes data 322B in which each bit is zero.

The checksum generator 126 may determine that block 314A is an allocated data block according to the metadata 318A. The checksum generator 126 may then determine whether block 314A is a zero block. Since the data 322A associated with block 314A is not zero, block 314A is not a zero block, and the checksum generator 126 calculates a first checksum 304A (having value 6A71) of allocated block 314A. The checksum generator 126 may determine that block 314B is an unallocated block according to metadata 318B. Since block 314B is unallocated, the checksum generator 126 uses a precomputed zero-block checksum value (000F) as the checksum 304B of unallocated block 314B. Similarly to block 314A, the checksum generator 126 may determine that block 314D is an allocated block according to metadata 318D. The checksum generator 126 then determines that block 314D is not a zero block. Since block 314D is not a zero block, the checksum generator 126 calculates a third checksum 304C (having value B292) of allocated block 314D.

The checksum generator 126 may determine that block 314C is an allocated data block according to metadata 318C. The checksum generator 126 may then determine whether block 314C is a zero block. Since the data 322B associated with block 314C is zero (e.g., each bit is zero), the checksum generator 126 uses a precomputed zero-block checksum value (000F) as the checksum 304B of allocated data block 314C.

In the example of FIG. 3A, the checksum generator 126 may calculate a result checksum 302 using checksum values 304, which include the first checksum 304A, the second checksum 304B, the second checksum 306B again, and the third checksum 304C, as input to a checksum algorithm. There may be additional blocks (not shown) between block 314C and 314D, and a checksum 304 may be calculated for each of the additional blocks. The checksum generator 126 may calculate the result checksum 302 of the checksums 304 in the order in which their corresponding blocks appear in the data (e.g., left to right in the example of FIG. 3A). In this example, the result checksum is 3910afda6a7f. That is, each of the checksums 304 may be provided as input to the checksum algorithm in the order in which the blocks 314 appear in the data. Note that although the block checksums 304 and the result checksum are shown as values of particular lengths (e.g., 2 bytes), each of the checksums 302, 304 may be of any suitable length. Further, each of the checksums 302, 304 may alternatively or additionally be hash values, which may be computed using a cryptographic hash function, for example.

Figure 3B:
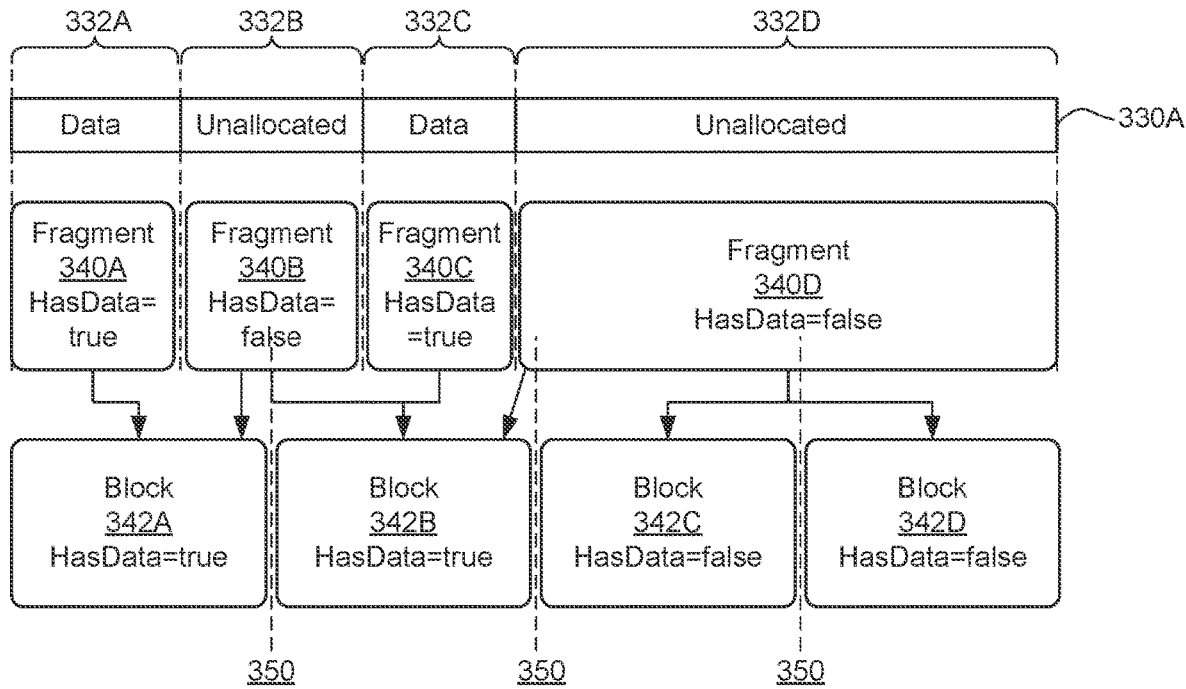
FIGS. 3B-3D depict examples of generating blocks from fragments, in accordance with one or more aspects of the present disclosure.
Figure 3C:
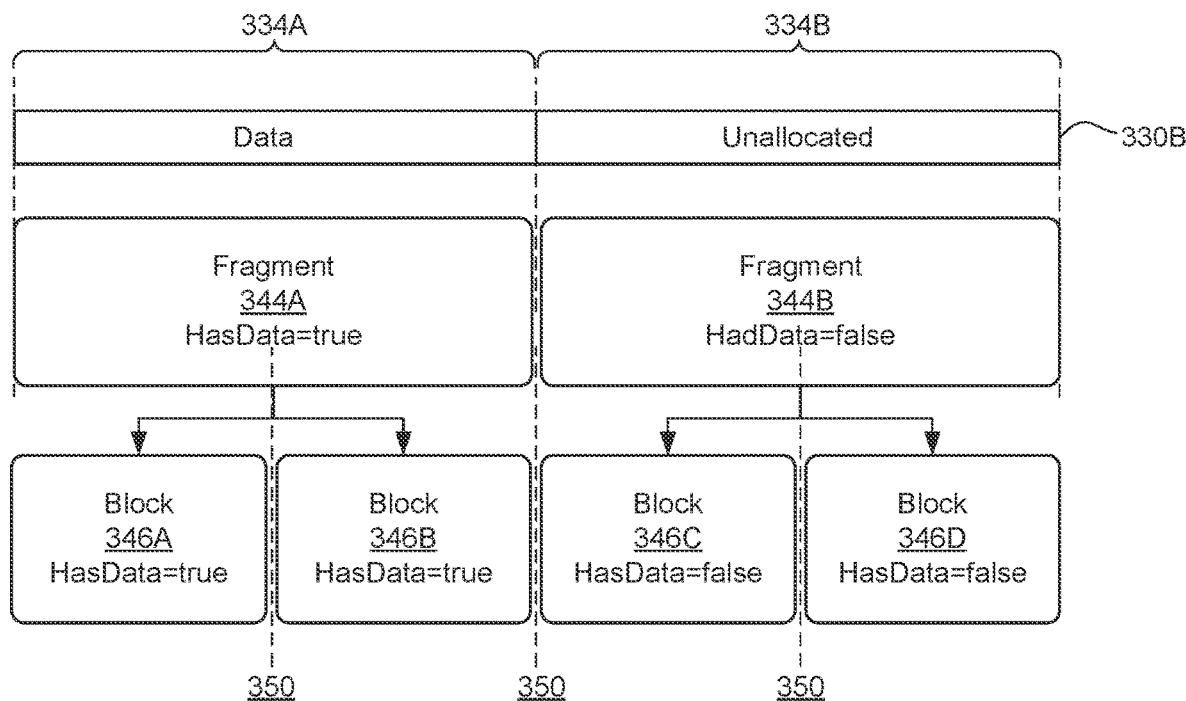
Figure 3D:
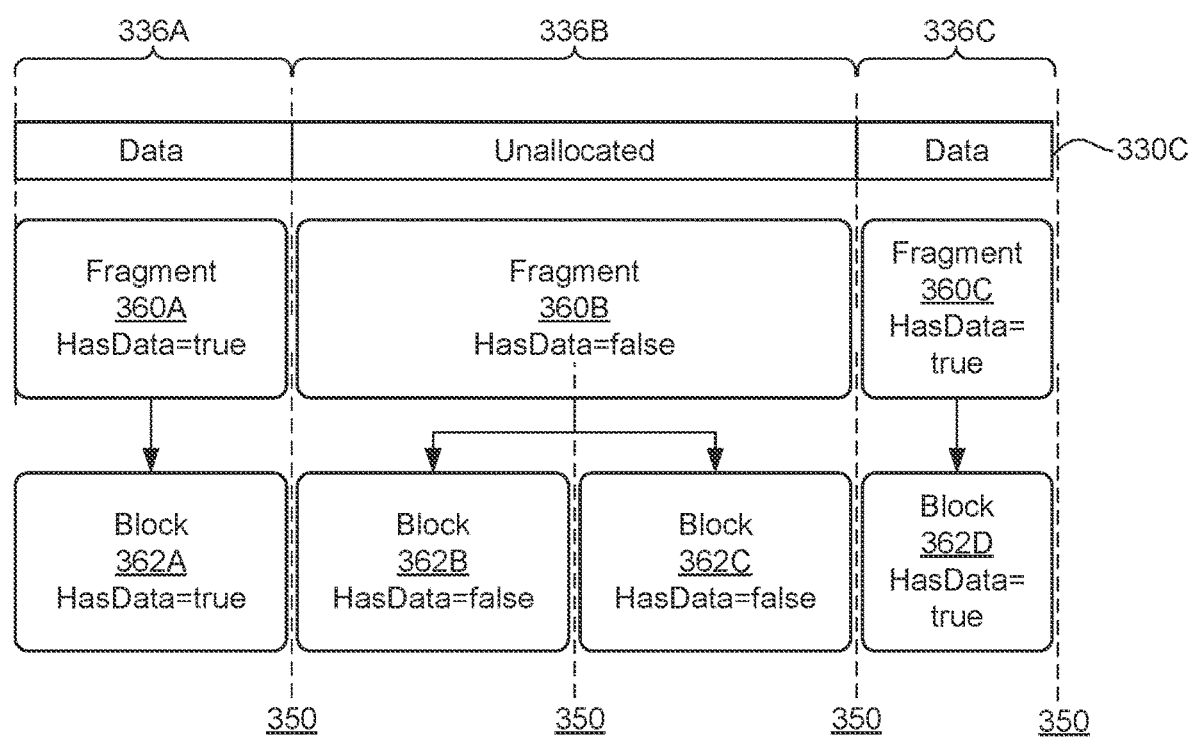

FIGS. 3B-3D depict examples of generating blocks 342 from fragments 340, in accordance with one or more aspects of the present disclosure. Boundaries between blocks are shown as vertical dashed lines 350. As described above with respect to FIG. 1, each fragment 340 may include a start location, length, and a "HasData" attribute. Fragments 340A and 340C each have HasData=true because they correspond to allocated portions 332A and 332C of input data 330A, respectively. Fragments 340B and 340D each have HasData=false because they correspond to unallocated portions 332B and 332D, respectively, of the input data 330A.

As shown in FIG. 3B, each fragment 340 that is smaller than the block size may be merged into a block 342 with one or more other fragments 340. The HasData attribute of a block 342 may be set to true if the HasData attribute of at least one of the fragments 340 merged into the block 342 is true.

Since fragment 340A is smaller than block 342A, e.g., the length of data corresponding to fragment 340A is less than the length of block 342A, which is the block length, there is remaining space in block 342A. The remaining space is used by a portion of fragment 340B. Thus, fragment 340A and a portion of fragment 340B are merged into block 342A. Block 342A's HasData is set to true because fragment 340A's HasData is true.

Fragment 340B is too large to fit in block 342A with fragment 340A, so fragment 340B is split between blocks 342A and 342B. The remaining portion of fragment 340B is merged into block 342B, leaving a portion of block 342B available. Fragment 340C is merged into the available portion of block 342B.

Since a block 342 that contains at least one non-zero bit corresponds to allocated data, merging may convert a block 340 initially corresponding to unallocated data to a block 340 corresponding to allocated data. In this example, fragment 340B corresponds to unallocated data, so block 342B's HasData attribute is initially set to false as a result of merging the portion of fragment 340B into block 342B. However, block 342B's HasData attribute is changed to true as a result of a fragment 340C, which has HasData=true, being merged into block 342B.

Fragment 340D is split into a first portion that is merged into block 342B and fills the remaining space in block 342B, a second portion that fills block 340C, and a third portion that fills block 342D. Since blocks 342D has HasData=false, the HasData attributes of blocks 342C and 342C, the HasData attributes of the second and third portions of fragment 340D merged into blocks 342C and 342D are both set to false.

As shown in FIG. 3C, fragments 156 larger than the block size may be split into multiple blocks. Fragment 344A has HasData=true because it corresponds to allocated portion 334A of input data 330B. Fragment 344B has HasData=false because it corresponds to unallocated portion 334B of input data 330B. Fragment 344A, which is larger than the block size and is allocated, is split into a first portion, which fills block 346A, and a second portion, which fills block 346B. The HasData attributes of blocks 345A and 346B are set to true because fragment 344A has HasData=true. Fragment 344B, which is larger than the block size and is unallocated, is split into a first portion, which fills block 346C, and a second portion, which fills block 346D. The HasData attributes of blocks 346C and 346D are set to false because fragment 344B has HasData=false.

As shown in FIG. 3D, if the end of the last fragment 360C does not correspond with the end of the last block, the length of the last block 362D may be smaller than the block size. Fragments 360A and 360C each have HasData=true because they correspond to allocated portions 336A and 336C of input data 330C, respectively. Fragment 360B has HasData=false because it corresponds to unallocated portion 336B of the input data 330B. Fragment 360A has a length equal to the block size, and fills block 362A. The HasData attribute of block 362A is set to true because fragment 360A's HasData is true.

Fragment 360B has a length equal to twice the block size, and is split into a first portion, which fills block 362B, and a second portion, which fills block 362C. The HasData attributes of blocks 362B and 362C are set to false because fragment 360B's HasData is false. Fragment 360C has a length less than the block size, and is the last fragment. Thus, a last block 362D has the same length as fragment 360C, and the length of the last block 362D is less than the block size.

Figure 4:
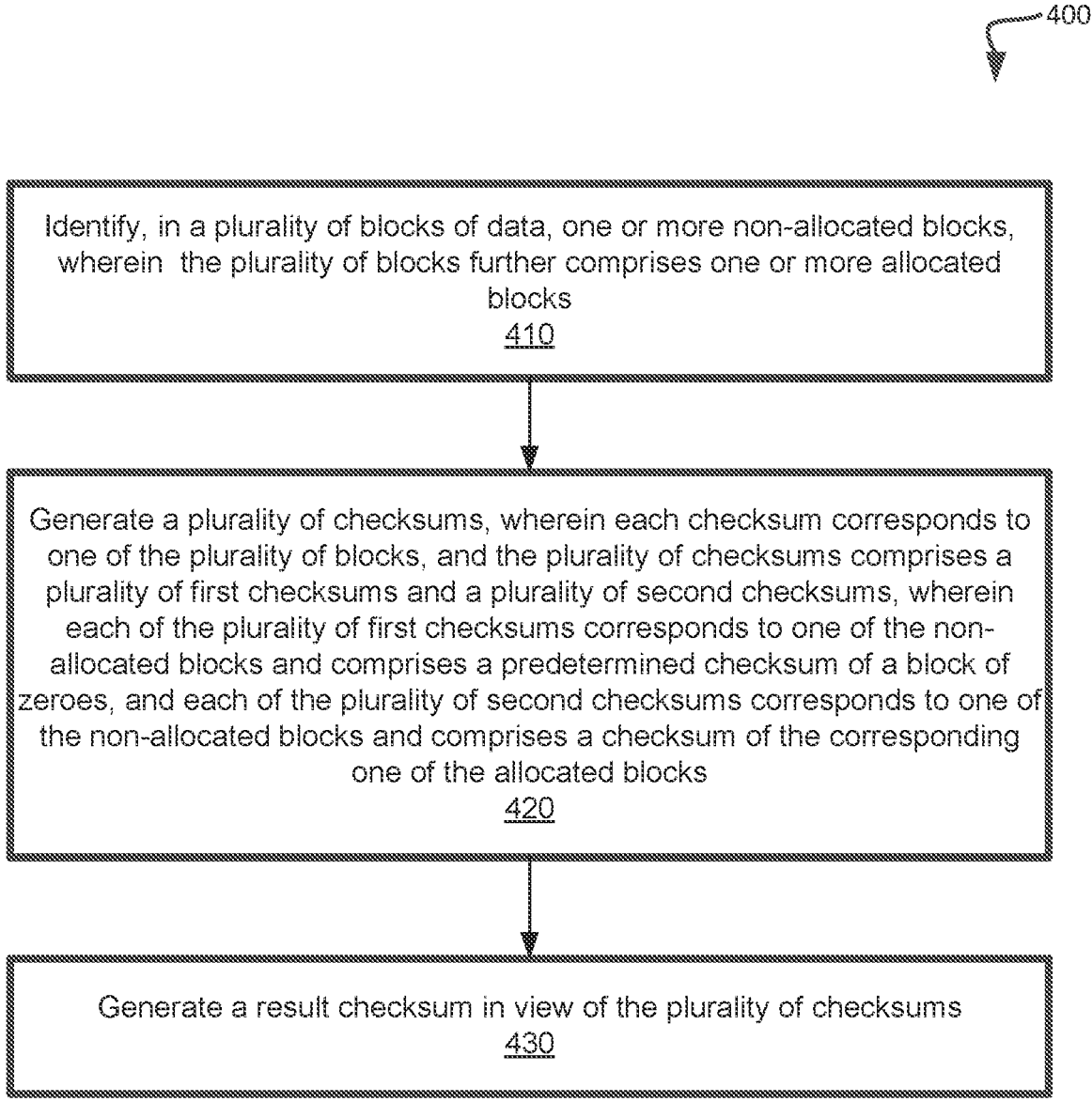
FIG. 4 depicts a flow diagram of an example method for generating checksums of data, in accordance with one or more aspects of the present disclosure.

FIG. 4 depicts a flow diagram of an example method for generating checksums of data, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system may identify, in a plurality of blocks of data, one or more unallocated blocks, wherein the plurality of blocks further comprises one or more allocated blocks. At block 420, the host computer system may generate a plurality of checksums, wherein each checksum corresponds to one of the plurality of blocks, and the plurality of checksums comprises a plurality of first checksums and a plurality of second checksums. Each of the plurality of first checksums may correspond to one of the unallocated blocks and comprises a predetermined checksum of a block of zeros, and each of the plurality of second checksums corresponds to one of the allocated blocks and comprises a checksum of the corresponding one of the allocated blocks. At block 430, the host computer system may generate a result checksum in view of the plurality of checksums. Responsive to completing the operations described herein above with references to block 430, the method may terminate.

Figure 5:
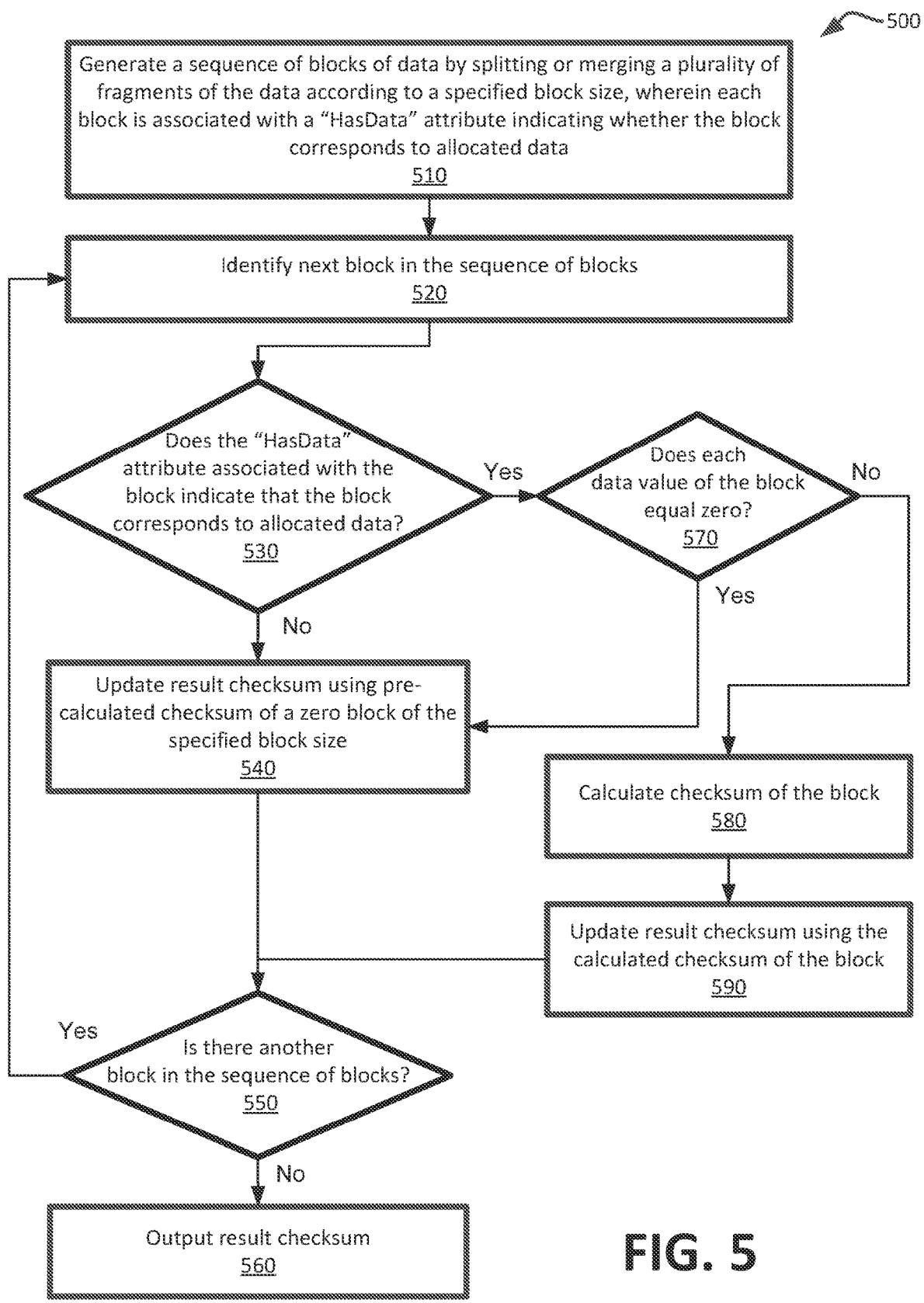
FIG. 5 depicts a flow diagram of an example method for generating checksums of sparsely-allocated data, in accordance with one or more aspects of the present disclosure.

FIG. 5 depicts a flow diagram of an example method for generating checksums of sparsely-allocated data, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

In one implementation, method 500 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at operation 510. At operation 510, a host computer system may generate a sequence of blocks of data by splitting and/or merging a plurality of fragments of the data according to a specified block size, wherein each block is associated with an allocation attribute (e.g., named "HasData") indicating whether the block corresponds to allocated data. At operation 520, the host computer system may identify a next block in the sequence of blocks. The next block in the sequence of blocks may be the first block in the sequence for the first execution of operation 520, and the next block in the sequence for each subsequent execution of operation 520.

At operation 530, the host computer system may determine whether the "HasData" attribute associated with the block indicates that the block corresponds to allocated data. If the "HasData" attribute indicates that the block corresponds to unallocated data (e.g., HasData=false), then at operation 540, the host computer system may update a result checksum using a pre-calculated checksum of a zero block of the specified block size. In particular embodiments, in the first execution of block 540, the update operation may calculate the pre-calculated checksum of the zero block (if not previously calculated) and generate an initial value of the result checksum using the pre-calculated checksum of the zero block. The update operation may be, e.g., the update checksum function described above with respect to the checksum generator 126 of FIG. 1.

At operation 550, the host computer system may determine whether there is another block in the sequence of blocks. If so, then the host computer system may continue execution at operation 520. If not, then at operation 560, the host computer system may output the result checksum as described below. If operation 530 determines that the "HasData" attribute associated with the block indicates that the block corresponds to allocated data, then at operation 570, the host computer system may determine whether each data value of the block equals zero. For example, the host computer system may determine whether each byte (or each bit) of the block equals zero. If each data value of the block equals zero, then the host computer system may continue execution at operation 540 by updating the result checksum using the pre-calculated checksum of the zero block. If at least one data value of the block does not equal zero, then the host computer system may continue execution at operation 580. At operation 580, the host computer system may calculate the checksum of the block. At operation 590, the host computer system may update the result checksum using the calculated checksum of the block. The host computer system may continue execution at operation 550 subsequent to operation 590. Operation 550 is described above.

The host computer system may execute operation 560 if operation 550 determines that there is not another block in the sequence of blocks. At operation 560, the host computer system may output the result checksum. The host computer system may determine the checksum to output by invoking the "get checksum" function as described above with respect to the checksum generator 126 of FIG. 1. The "get checksum" function may return the current value of the checksum, as updated by the "update" function invoked at operation 540 and/or 590. Responsive to completing the operations described herein above with reference to operation 560, the method may terminate.

Figure 6:
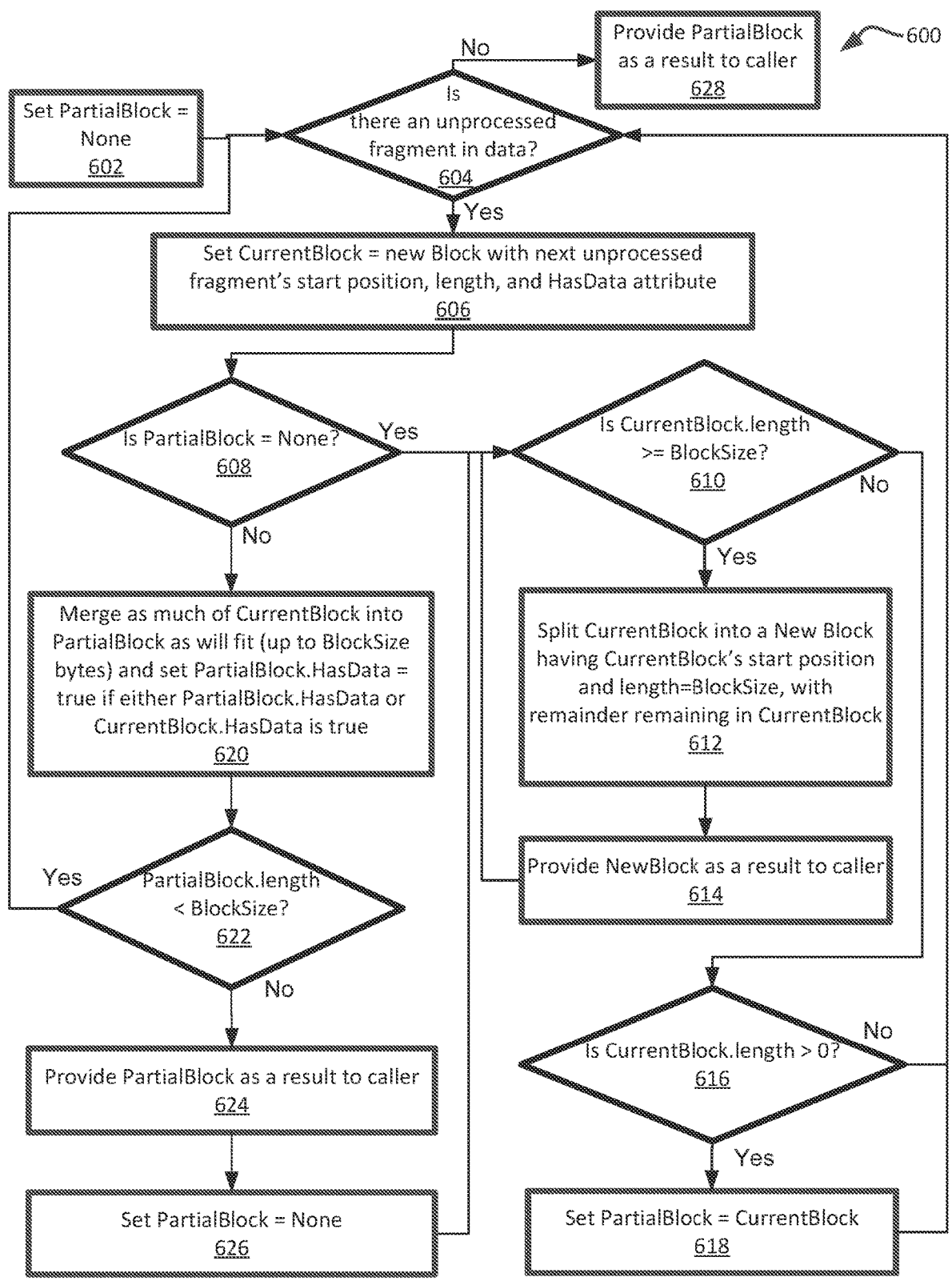
FIG. 6 depicts a flow diagram of an example method for generating blocks from fragments, in accordance with one or more aspects of the present disclosure.

FIG. 6 depicts a flow diagram of an example method 600 for generating blocks from fragments, in accordance with one or more aspects of the present disclosure. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processes implementing method 600 may be executed asynchronously with respect to each other.

In one implementation, method 600 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 600 may be performed by processing devices of a server device or a client device and may begin at operation 602. In method 600, blocks 160 may be represented by variables named CurrentBlock, PartialBlock, and NewBlock, which may be data structures such as instances of a Block data type. Each Block may have an associated start position, length, and "HasData" attribute that indicates whether the block corresponds to allocated data 153. At operation 602, a host computer system may set PartialBlock=None to indicate that PartialBlock does not reference a block. The method 600 may subsequently set PartialBlock to a block that has been partially filled, e.g., corresponds to a portion of input data 152 that is smaller than the block size. At operation 604, the host computer system may determine whether there is at least one unprocessed fragment 156 in the input data 152 (e.g., a fragment 156 that has not been processed by method 600).

If at operation 604 the host computer system determines that there is at least one unprocessed fragment 156 in the input data, then at operation 606, the host computer system may allocate a new Block instance corresponding to the next unprocessed fragment's start position, length, and allocation attribute. At operation 608, the host computer system may determine whether the variable PartialBlock is equal to None. If so, then the host computer system may perform operation 610. If not, the host computer system may perform operation 620.

At operation 610, the host computer system may determine whether CurrentBlock's length is greater than or equal to the block size ("BlockSize"). If so, at operation 612, the host computer system may split CurrentBlock into a New Block having CurrentBlock's start position and length=BlockSize, with the remainder (e.g., data beyond the block size) remaining in CurrentBlock. At operation 614, the host computer system may provide NewBlock as a result to the caller (e.g., to a method that invoked method 600). The host computer system 614 may then proceed to perform operation 610 again.

If at operation 610 the host computer system determines that CurrentBlock's length is not greater than BlockSize, then at operation 616, the host computer system may determine whether CurrentBlock's length is greater than zero. If so, the host computer system may proceed to perform operation 618. At operation 618, the host computer system may set PartialBlock to CurrentBlock and proceed to perform operation 604 again. If operation 616 determines that CurrentBlock's length is not greater than 0, then the host computer system may proceed to perform block 604 again (e.g., to process the next fragment, if any).

If at operation 608 the host computer system determines that PartialBlock is not equal to None, then the host computer system may proceed to perform block 620. At block 620, the host computer system may merge as much of CurrentBlock into PartialBlock as will fit (up to BlockSize bytes). Further, at block 620 the host computer system and set PartialBlock.allocated to true if either PartialBlock.allocated or CurrentBlock.allocated is true. At block 622, the host computer system may determine whether PartialBlock's length is less than BlockSize. If so, the host computer system may proceed to perform block 604 again (e.g., to process the next fragment, if any). If at operation 622 the host computer system determines that PartialBlock.length is not less than BlockSize, then the host computer system may proceed to perform block 624. At block 624, the host computer system may provide PartialBlock as a result to the caller. At block 626, the host computer system may set PartialBlock=None. The host computer system may then proceed to perform operation 610, which is described above.

Operation 628 may be reached if at block 604 the host computer system determines that there are no unprocessed fragments in the input data. At operation 628, the host computer system may provide PartialBlock as a result to the caller (e.g., by returning PartialBlock to program code that invoked the method 600). If PartialBlock is None, operation 628 may return a value corresponding to None (e.g., no partial block, or an empty partial block) to the caller. Responsive to completing the operations described herein above with reference to operation 628, the method may terminate.

Figure 7:
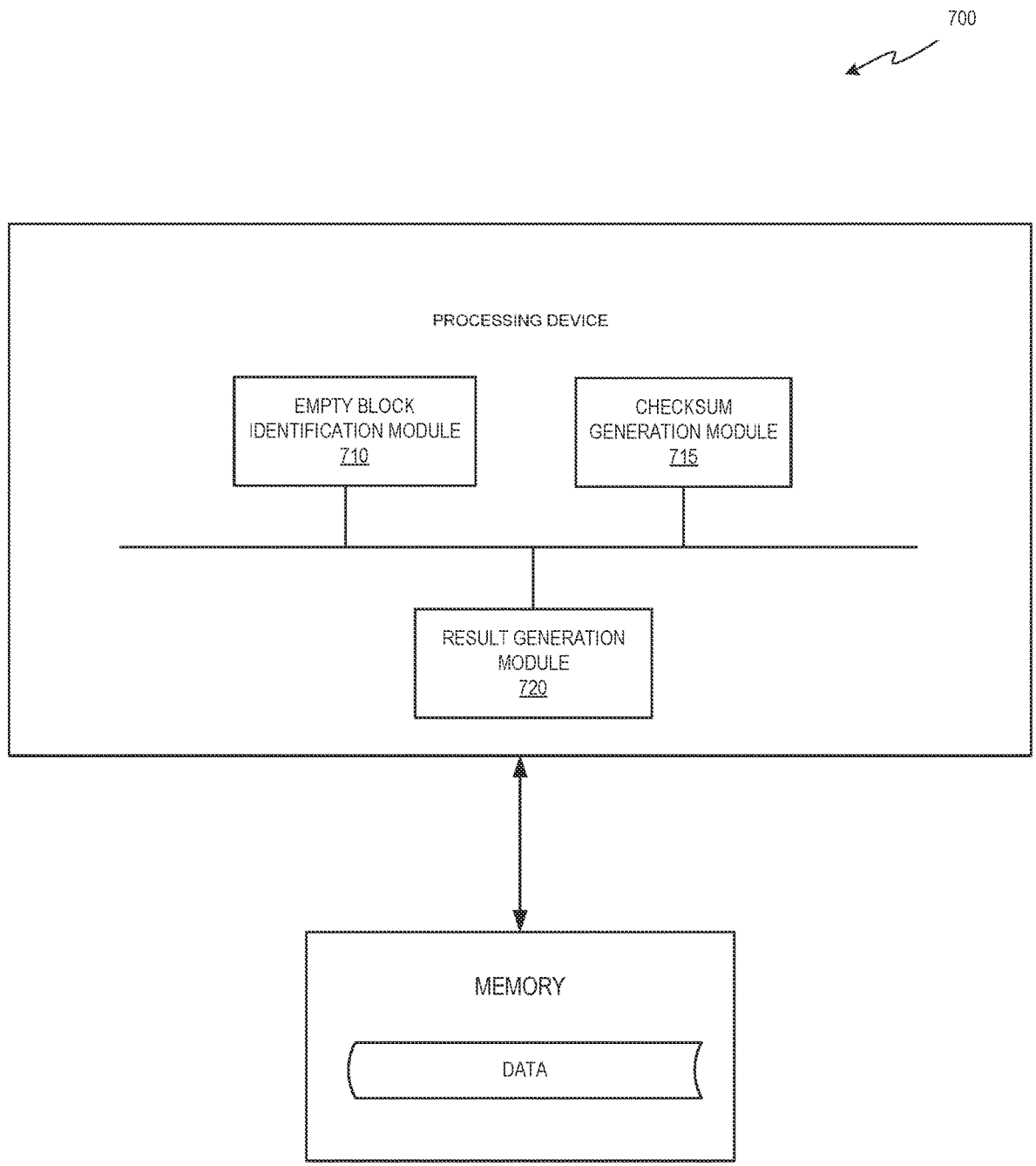
FIG. 7 depicts a block diagram of a computer system operating in accordance with one or more aspects of the present disclosure.

FIG. 7 depicts a block diagram of a computer system 700 operating in accordance with one or more aspects of the present disclosure. Computer system 700 may be the same or similar to computing device 100 of FIG. 1, and may include one or more processors and one or more memory devices. In the example shown, computer system 700 may include an unallocated block identification module 710, a checksum generation module 715, and a result generation module 720.

Unallocated block identification module 710 may enable a processor to identify, in a plurality of blocks of data, one or more unallocated blocks, wherein the plurality of blocks further comprises one or more allocated blocks. Checksum generation module 715 may enable the processor to generate a plurality of checksums, wherein each checksum corresponds to one of the plurality of blocks, and the plurality of checksums comprises a plurality of first checksums and a plurality of second checksums. Result generation module may generate a result checksum in view of the plurality of checksums.

Figure 8:
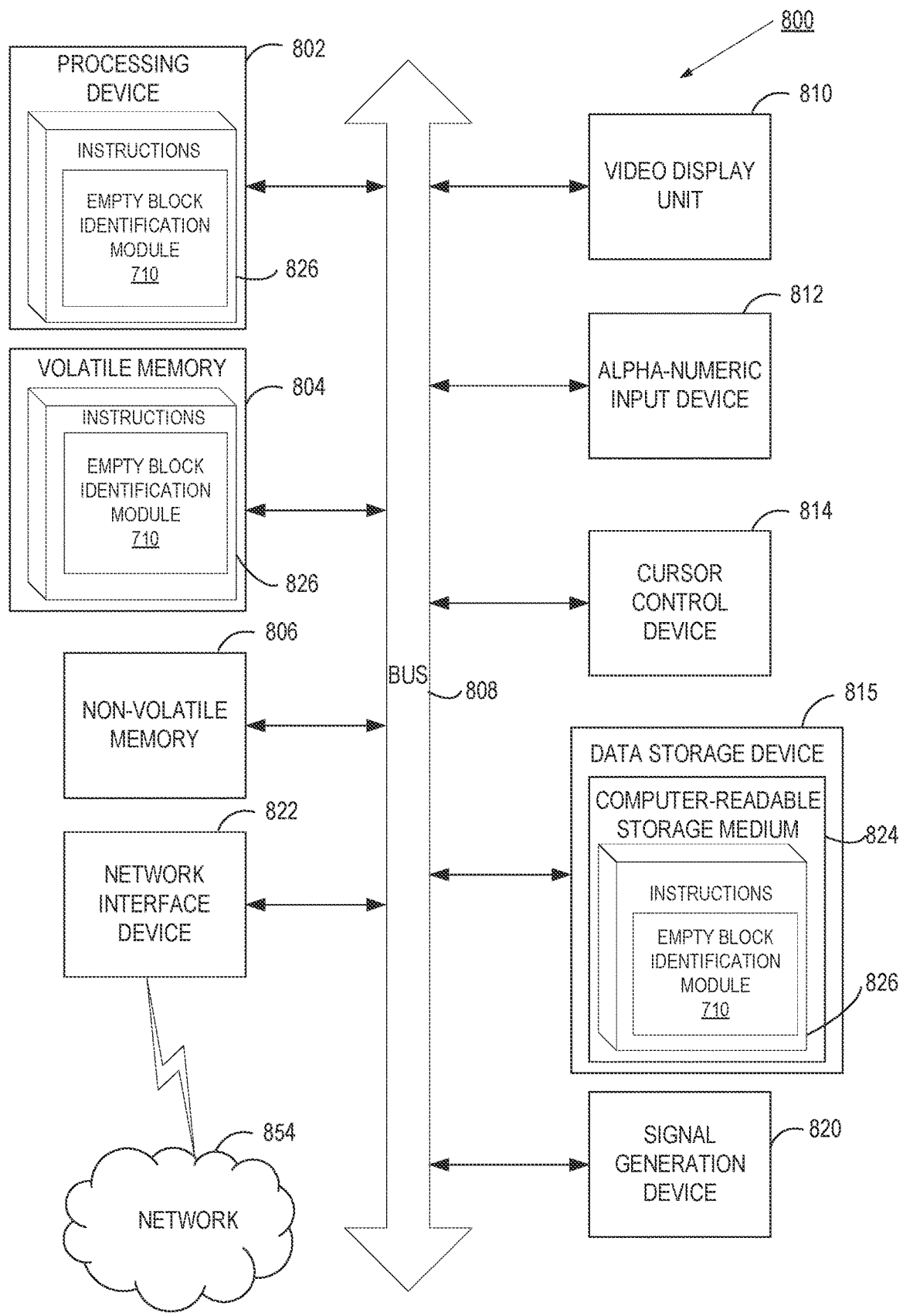
FIG. 8 depicts a block diagram of an illustrative computing device operating in accordance with the examples of the present disclosure.

FIG. 8 depicts a block diagram of a computer system operating in accordance with one or more aspects of the present disclosure. In various illustrative examples, computer system 800 may correspond to computer system 100 of FIG. 1. Computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing method 400 or 500.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
generating, by a processing device, a plurality of blocks of data in view of a plurality of fragments of data and a block size, wherein each fragment comprises a fragment allocation attribute indicating whether the fragment corresponds to an allocated portion of the data, wherein each of the plurality of blocks corresponds to one or more of the fragments;
determining a respective block allocation attribute of each block in view of one or more fragment allocation attributes, wherein each of the fragment allocation attributes is comprised by one of the plurality of fragments that correspond to the block;
identifying, by the processing device, in the plurality of blocks of data, one or more unallocated blocks in view of the respective block allocation attribute of each block, wherein the plurality of blocks further comprises one or more allocated blocks;
generating a plurality of checksums, wherein each checksum corresponds to one of the plurality of blocks, and the plurality of checksums comprises a plurality of first checksums and a plurality of second checksums, wherein each of the plurality of first checksums corresponds to one of the unallocated blocks and comprises a predetermined checksum of a block of zeros, and wherein each of the plurality of second checksums corresponds to one of the allocated blocks and comprises a checksum of the corresponding one of the allocated blocks; and
generating a result checksum in view of the plurality of checksums to verify whether a virtual disk or an image file has been modified.

2. The method of claim 1, wherein each of the plurality of blocks is associated with a block allocation attribute indicating whether a portion of the data to which the block corresponds is allocated, and
wherein identifying, in the plurality of blocks of data, the one or more unallocated blocks comprises identifying one or more particular blocks of the plurality of blocks, wherein the block allocation attribute of each of the identified particular blocks indicates that the portion of the data to which the particular block corresponds is unallocated.

3. The method of claim 1, wherein generating the plurality of checksums comprises:
generating each of the plurality of second checksums in view of the corresponding allocated block of the allocated blocks, wherein generating each of the plurality of second checksums comprises:
for each of the allocated blocks:
determining whether the allocated block corresponds to the block of zeros, and
responsive to determining that the allocated block corresponds to the block of zeros, including the predetermined checksum of the block of zeros as the checksum of the allocated block.

4. The method of claim 3, wherein determining whether the allocated block corresponds to the block of zeros comprises determining whether each data value associated with the allocated block is zero.

5. The method of claim 1, wherein generating the result checksum in view of the plurality of checksums comprises:
providing each of the plurality of checksums to a checksum function, wherein the checksum function generates the result checksum, and the checksums are provided to the checksum function in an order determined according to an order in which the plurality of blocks appear in the data.

6. The method of claim 1, wherein generating the result checksum in view of the plurality of checksums comprises:
performing, for each of the blocks, a checksum update operation that updates the result checksum in view of the checksum that corresponds to the block.

7. The method of claim 1, wherein each of the plurality of checksums comprises a cryptographic hash of the corresponding block, and result checksum comprises a cryptographic hash of the plurality of checksums.

8. The method of claim 1, wherein the data corresponds to one or more of a disk image file or a virtual disk.

9. The method of claim 1, further comprising:
receiving an image file uploaded from a client system;
receiving an image checksum from the client system, wherein the image checksum corresponds to the image file; and
generating, in view of the image file, a virtual disk that comprises the data.

10. The method of claim 1, further comprising:
receiving, from a client system, a request to download a virtual disk;
sending, to the client system, the virtual disk, wherein the virtual disk comprises the data; and
sending, to the client system, the generated result checksum.

11. The method of claim 1, wherein a virtual disk comprises the data, the method further comprising:
receiving a request to perform an operation associated with the virtual disk;
performing the operation, wherein the operation generates a second virtual disk comprising second data;
verifying the second virtual disk, wherein the verifying comprises:
generating a second checksum of the second virtual disk; and
determining whether the second checksum corresponds to the generated result checksum.

12. The method of claim 11, wherein the operation comprises one or more of: cloning the virtual disk, moving the virtual disk between storage devices, creating a snapshot of the virtual disk, or deleting a snapshot of the virtual disk.

13. The method of claim 1, wherein a virtual disk comprises the data, and the virtual disk is associated with an initial checksum that corresponds to an initial state of the virtual disk, the method further comprising:
verifying that the virtual disk has not been modified, wherein the verifying comprises determining whether the initial checksum corresponds to the generated result checksum.

14. A system comprising:
a memory; and
a processing device operatively coupled to the memory, wherein the processing device processes instructions synchronously in accordance with a processor clock, the processing device to:
generate a plurality of blocks of data in view of a plurality of fragments of data and a block size, wherein each fragment comprises a fragment allocation attribute indicating whether the fragment corresponds to an allocated portion of the data, wherein each of the plurality of blocks corresponds to one or more of the fragments;
determining a respective block allocation attribute of each block in view of one or more fragment allocation attributes, wherein each of the fragment allocation attributes is comprised by one of the plurality of fragments that correspond to the block;

identify, in the plurality of blocks of data, one or more unallocated blocks in view of the respective block allocation attribute of each block, wherein the plurality of blocks further comprises one or more allocated blocks;

generate a plurality of checksums, wherein each checksum corresponds to one of the plurality of blocks, and the plurality of checksums comprises a plurality of first checksums and a plurality of second checksums, wherein each of the plurality of first checksums corresponds to one of the unallocated blocks and comprises a predetermined checksum of a block of zeros, and wherein each of the plurality of second checksums corresponds to one of the allocated blocks and comprises a checksum of the corresponding one of the allocated blocks; and generate a result checksum in view of the plurality of checksums to verify whether a virtual disk or an image file has been modified.

15. The system of claim 14, wherein each of the plurality of blocks is associated with a block allocation attribute indicating whether a portion of the data to which the block corresponds is allocated, and wherein to identify, in the plurality of blocks of data, the one or more unallocated blocks, the processing device is further to:

identify one or more particular blocks of the plurality of blocks, wherein the block allocation attribute of each of the identified particular blocks indicates that the portion of the data to which the particular block corresponds is unallocated.

16. A non-transitory, computer-readable medium storing instructions that, when executed by a processing device, cause the processing device to:

generate a plurality of blocks of data in view of a plurality of fragments of data and a block size, wherein each fragment comprises a fragment allocation attribute indicating whether the fragment corresponds to an allocated portion of the data, wherein each of the plurality of blocks corresponds to one or more of the fragments;

determine a respective block allocation attribute of each block in view of one or more fragment allocation attributes, wherein each of the fragment allocation attributes is comprised by one of the plurality of fragments that correspond to the block;

identify, in the plurality of blocks of data, one or more unallocated blocks in view of the respective block allocation attribute of each block, wherein the plurality of blocks further comprises one or more allocated blocks;

generate a plurality of checksums, wherein each checksum corresponds to one of the plurality of blocks, and the plurality of checksums comprises a plurality of first checksums and a plurality of second checksums, wherein each of the plurality of first checksums corresponds to one of the unallocated blocks and comprises a predetermined checksum of a block of zeros, and wherein each of the plurality of second checksums corresponds to one of the allocated blocks and comprises a checksum of the corresponding one of the allocated blocks; and generate a result checksum in view of the plurality of checksums to verify whether a virtual disk or an image file has been modified.

17. The non-transitory, computer-readable medium of claim 16, wherein each of the plurality of blocks is associated with a block allocation attribute indicating whether a portion of the data to which the block corresponds is allocated, and wherein to identify, in the plurality of blocks of data, the one or more unallocated blocks, the processing device is further to:

identify one or more particular blocks of the plurality of blocks, wherein the block allocation attribute of each of the identified particular blocks indicates that the portion of the data to which the particular block corresponds is unallocated.

* * * * *